United States Patent
Karnofski et al.

(10) Patent No.: US 10,753,225 B2
(45) Date of Patent: Aug. 25, 2020

(54) ENGINE TURNING MOTOR VIA PNEUMATIC OR HYDRAULIC MOTOR

(71) Applicant: The Boeing Company, Chicago, IL (US)

(72) Inventors: Kent E. Karnofski, Lake Forest Park, WA (US); Chris T. Jasklowski, Redmond, WA (US); Jason J. Jackowski, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 525 days.

(21) Appl. No.: 15/475,890

(22) Filed: Mar. 31, 2017

(65) Prior Publication Data

US 2018/0283199 A1   Oct. 4, 2018

(51) Int. Cl.
| | |
|---|---|
| *F01D 17/26* | (2006.01) |
| *F01D 25/24* | (2006.01) |
| *F01D 21/12* | (2006.01) |
| *F01D 25/34* | (2006.01) |
| *B64D 27/16* | (2006.01) |

(Continued)

(52) U.S. Cl.
CPC .............. *F01D 17/26* (2013.01); *B64D 27/16* (2013.01); *B64D 27/26* (2013.01); *F01D 19/00* (2013.01); *F01D 21/12* (2013.01); *F01D 25/24* (2013.01); *F01D 25/34* (2013.01); *B64D 2027/268* (2013.01); *F05D 2260/406* (2013.01); *F05D 2260/42* (2013.01); *F05D 2260/85* (2013.01); *F05D 2260/941* (2013.01); *Y02T 50/671* (2013.01)

(58) Field of Classification Search
CPC .. B64D 2027/268; B64D 27/16; B64D 27/26; F01D 17/26; F01D 19/00; F01D 21/12; F01D 25/24; F01D 25/34; F05D 2260/406; F05D 2260/42; F05D 2260/85; F05D 2260/941; Y02T 50/671
See application file for complete search history.

(56) References Cited

U.S. PATENT DOCUMENTS 2,592,938 A * 4/1952 McNaught .............. F02K 7/005
                                                60/201
2,949,891 A * 8/1960 Shube ..................... B64C 13/00
                                                418/206.1

(Continued)

FOREIGN PATENT DOCUMENTS

| EP | 1507068 | 2/2005 |
| EP | 2305986 | 4/2011 |

(Continued)

OTHER PUBLICATIONS

Extended European Search Report dated Jun. 4, 2018 for European Patent Application No. 18160131.1.

(Continued)

*Primary Examiner* — George C Jin
*Assistant Examiner* — Teuta B Holbrook
(74) *Attorney, Agent, or Firm* — Gates & Cooper LLP

(57) ABSTRACT

Pressurized fluid is stored while a jet engine is running. After engine shutdown, the fluid is used to drive a pneumatic or hydraulic turning motor that rotates the engine's High Pressure (HP) rotor. The rotation encourages even heat distribution across the HP rotor and thus prevents bowing of the HP rotor.

20 Claims, 11 Drawing Sheets

(51) Int. Cl.
*B64D 27/26* (2006.01)
*F01D 19/00* (2006.01)

(56) References Cited

U.S. PATENT DOCUMENTS

| | | | |
|---|---|---|---|
| 3,180,614 A | 4/1965 | Ellenberger et al. | |
| 4,002,414 A * | 1/1977 | Coleman, Jr. | F02C 3/02 |
| | | | 416/223 A |
| 4,493,184 A * | 1/1985 | Nikkanen | B64D 33/08 |
| | | | 415/116 |
| 4,703,326 A * | 10/1987 | Ding | G08C 17/00 |
| | | | 340/870.11 |
| 5,089,211 A * | 2/1992 | Dillmann | G21C 7/12 |
| | | | 376/232 |
| 8,820,046 B2 | 9/2014 | Ross et al. | |
| 9,664,070 B1 * | 5/2017 | Clauson | F01D 25/36 |
| 2008/0273976 A1 * | 11/2008 | Suciu | F01D 5/148 |
| | | | 416/46 |
| 2009/0113871 A1 * | 5/2009 | Certain | B64C 27/12 |
| | | | 60/39.43 |
| 2009/0211247 A1 * | 8/2009 | McEwan | F01N 11/002 |
| | | | 60/602 |
| 2009/0324438 A1 * | 12/2009 | Veilleux, Jr. | F04B 1/07 |
| | | | 418/25 |
| 2010/0107651 A1 * | 5/2010 | Hyde | F02C 6/00 |
| | | | 60/784 |
| 2010/0329866 A1 * | 12/2010 | Hunt | B63B 21/50 |
| | | | 416/159 |
| 2011/0027061 A1 * | 2/2011 | Noack | F01D 21/006 |
| | | | 415/1 |
| 2013/0031912 A1 * | 2/2013 | Finney | F01D 15/10 |
| | | | 60/778 |
| 2013/0091850 A1 | 4/2013 | Francisco | |
| 2014/0050559 A1 * | 2/2014 | James | F01D 11/06 |
| | | | 415/1 |
| 2014/0250902 A1 * | 9/2014 | Kraft | F02C 6/16 |
| | | | 60/773 |
| 2014/0373553 A1 * | 12/2014 | Zaccaria | F02C 7/277 |
| | | | 60/778 |
| 2016/0348588 A1 * | 12/2016 | Ross | F01D 19/02 |
| 2017/0082029 A1 * | 3/2017 | Zipperer | F02C 3/04 |
| 2017/0218848 A1 * | 8/2017 | Alstad | F02C 7/32 |
| 2017/0234158 A1 * | 8/2017 | Savela | F02K 3/06 |
| | | | 416/1 |
| 2017/0234232 A1 * | 8/2017 | Sheridan | H02J 7/0068 |
| | | | 307/9.1 |
| 2017/0234235 A1 * | 8/2017 | Pech | F02C 7/27 |
| | | | 290/31 |
| 2017/0370242 A1 * | 12/2017 | Bacic | B64D 13/02 |
| 2018/0010523 A1 * | 1/2018 | Harder | F02C 7/275 |
| 2018/0216537 A1 * | 8/2018 | Greenberg | F01D 19/02 |
| 2018/0223738 A1 * | 8/2018 | Greenberg | F01D 19/00 |

FOREIGN PATENT DOCUMENTS

| | | |
|---|---|---|
| EP | 2554799 | 2/2013 |
| EP | 2602458 | 6/2013 |
| EP | 3051074 | 8/2016 |
| EP | 3211184 | 8/2017 |
| WO | 2013072291 | 5/2013 |

OTHER PUBLICATIONS

Extended European Search Report dated Oct. 10, 2018 for European Patent Application No. 18163383.5.
European Communication dated Jan. 21, 2020 for European Patent Application No. 18163383.5.

* cited by examiner

ENGINE TURNING MOTOR VIA PNEUMATIC OR HYDRAULIC MOTOR

BACKGROUND

1. Field

The present disclosure relates to a system for rotating a rotor in a gas turbine engine.

2. Description of the Related Art

FIG. 1A illustrates an aircraft engine comprising a fan 100, a low pressure (LP) compressor 102, a fan case 104, an engine casing 106, a High Pressure (HP) compressor 108, a HP turbine 110, a LP turbine 112, and a LP shaft 114 connecting the LP compressor 102 and the LP turbine 112. After engine shutdown on the ground, residual hot air 116 in the engine core rises 118 and is trapped by the engine casing 106. As the hot air rises 118, the upper portion 120 of the HP compressor's (engine's rotor) 108 rotor shaft 122 becomes hotter than the lower portion 124 of the rotor shaft 122 and causes uneven cooling and thermal deformation of the engine rotor shaft 122 (i.e., rotor bowing B, where the upper portion 120 of the rotor shaft 122 becomes longer than the lower portion 124). Upon engine restart (e.g., prior to fuel ignition in the combustor 126), even tiny fractions of rotor shaft 122 bowing can cause the HP compressor (engine's rotor) 108 to rub against the engine's casing 106. The rub causes vibrations (manifested as disconcerting noise in the aircraft cabin) or even damage to the aircraft (e.g., engine damage, damage to the engine case lining, or damage to other accessories). FIG. 1B illustrates that on an aircraft 130, the engine 132 is housed in a nacelle 134. The nacelle 134 may also trap rising 118 hot air 116 that causes a temperature gradient T. Also shown in FIG. 1A is flow 136 of air into the engine 132.

One method to mitigate these problems is to build the engine with wider cold build clearances ("opened up" clearances), so that the compressor rotor shaft 122 can bow without causing blades to rub on the engine casing 106. However, more advanced engine designs prefer less "gap" between the engine casing and the compressor rotors (tighter "cold build clearances") to reduce air leakage and improve thrust specific fuel consumption (TSFC). Thus, the overriding need to reduce fuel consumption renders wider cold build clearances less desirable. Indeed, as ever tighter cold build clearances are implemented, the problems caused by engine rub will become more severe.

Conceivably, an engine architecture could add rotor stiffening or bearing arrangements to reduce the amount of rotor shaft bow that is physically possible. However, these architecture changes would add weight and manufacturing cost to the engine.

Other methods of mitigating rotor shaft bow comprise rotating the shaft (1) so that the shaft cools uniformly, returns to thermal equilibrium, and straightens, and/or (2) so that centrifugal forces straighten the bow. The shaft rotation is achieved (1) by motoring the engine at relatively low revolutions per minute (RPM) after starting the engine (but before running the engine at high RPM) and/or (2) using an Engine Turning Motor (ETM) to turn the rotor shaft when the engine is off.

However, conventional methods for providing power to the ETM or the engine so as to straighten the bow can be problematic. Some smaller aircraft, such as the Boeing 737 airplane, fly into remote airports where facility power is not available to power the ETM or engine. Furthermore, auxiliary power unit (APU) power on the aircraft is not always available to power the engine or ETM because some airports limit APU use at gates due to emissions and noise concerns and aircraft are not powered when they are towed between gates. In addition, airplanes may operate with a nonfunctional APU or the powering of the ETM or engine may cause undesirable APU wear (extended motoring prolongs the APU's exposure to main engine start (MES) mode, reducing APU life). Finally, the use of lithium-ion and nickel-cadmium batteries for powering the ETM is problematic due to high failure rates and flammability concerns associated with the engine environment (extreme heat, extreme cold, and high vibration).

Moreover, rotating the shaft shortly before departure causes departure delays, especially if reduced engine clearances require turning the rotor at low speeds. These delays not only inconvenience the passengers but also increase costs associated with increased waiting times and parking fees.

What is needed then, is a more efficient method for mitigating rotor shaft bowing that simplifies ground logistics. The present disclosure satisfies this need.

SUMMARY

The present disclosure describes an aircraft engine assembly comprising a rotor and means for rotating the rotor using a hydraulic or pneumatic system so that the rotating reduces or prevents thermal bowing of the rotor shaft in an environment exposing the rotor shaft to a temperature/thermal gradient.

In one embodiment, the means comprises a pressure vessel for containing compressed air; an air supply valve connected to the pressure vessel; a pneumatic motor connected to the valve; and ducting connected to the valve, the pressure vessel, and the pneumatic motor. The pneumatic motor rotates the rotor shaft when the rotor shaft is coupled to the pneumatic motor and compressed air is supplied from the pressure vessel to the pneumatic motor through the ducting and the valve.

In one embodiment, the pneumatic motor is connected to a transmission connected to the rotor shaft. The pneumatic motor converts pressure exerted by the compressed air into torque and the transmission applies the torque to the rotor shaft so as to rotate the rotor.

In another embodiment, the pneumatic motor comprises an accessory turbine mounted on the rotor. The pneumatic motor converts pressure exerted by the compressed air into torque and the accessory turbine applies torque directly to the rotor shaft.

In yet another embodiment, the pneumatic motor comprises an air stepper motor. In one example, a pneumatic timer is connected to the valve and the pneumatic motor rotates the rotor shaft when the pneumatic timer pulses the compressed air so as to deliver pulses of the compressed air to the pneumatic motor.

In yet a further embodiment, the means comprises a pressure vessel for containing oil; a valve connected to the pressure vessel; an oil timer connected to the valve; a hydraulic motor connected to the oil timer; and ducting connected to the valve, the pressure vessel, and the hydraulic motor. The hydraulic motor rotates the rotor shaft when the hydraulic motor is coupled to the rotor shaft and the oil is supplied to the hydraulic motor from the pressure vessel through the ducting, the oil timer, and the valve.

The pneumatic/oil timer and pressure vessel are mounted on the aircraft engine, e.g., on a nacelle, housing, or engine casing. Exemplary locations for the pressure vessel include, but are not limited to, in a thrust link, a brace, or a strut link attached to the gas turbine engine.

The present disclosure further describes a method of rotating a rotor shaft in an aircraft engine, comprising storing pressurized fluid on an aircraft comprising a nacelle housing a gas turbine engine; and driving the rotor shaft using the pressurized fluid, when the rotor shaft is cooling down in a temperature gradient perpendicular to a longitudinal axis of the rotor shaft, thereby reducing or preventing any thermal bowing of the rotor shaft in the temperature gradient.

In one embodiment, the storing comprises charging the pressure vessel with high pressure air or oil during engine operation. In one embodiment, after engine shut down, a valve connected to the pressure vessel opens automatically upon receiving signal from an engine shut off switch, thereby activating the pneumatic or hydraulic motor.

BRIEF DESCRIPTION OF THE DRAWINGS

Referring now to the drawings in which like reference numbers represent corresponding parts throughout.

DESCRIPTION

Figure 1A:
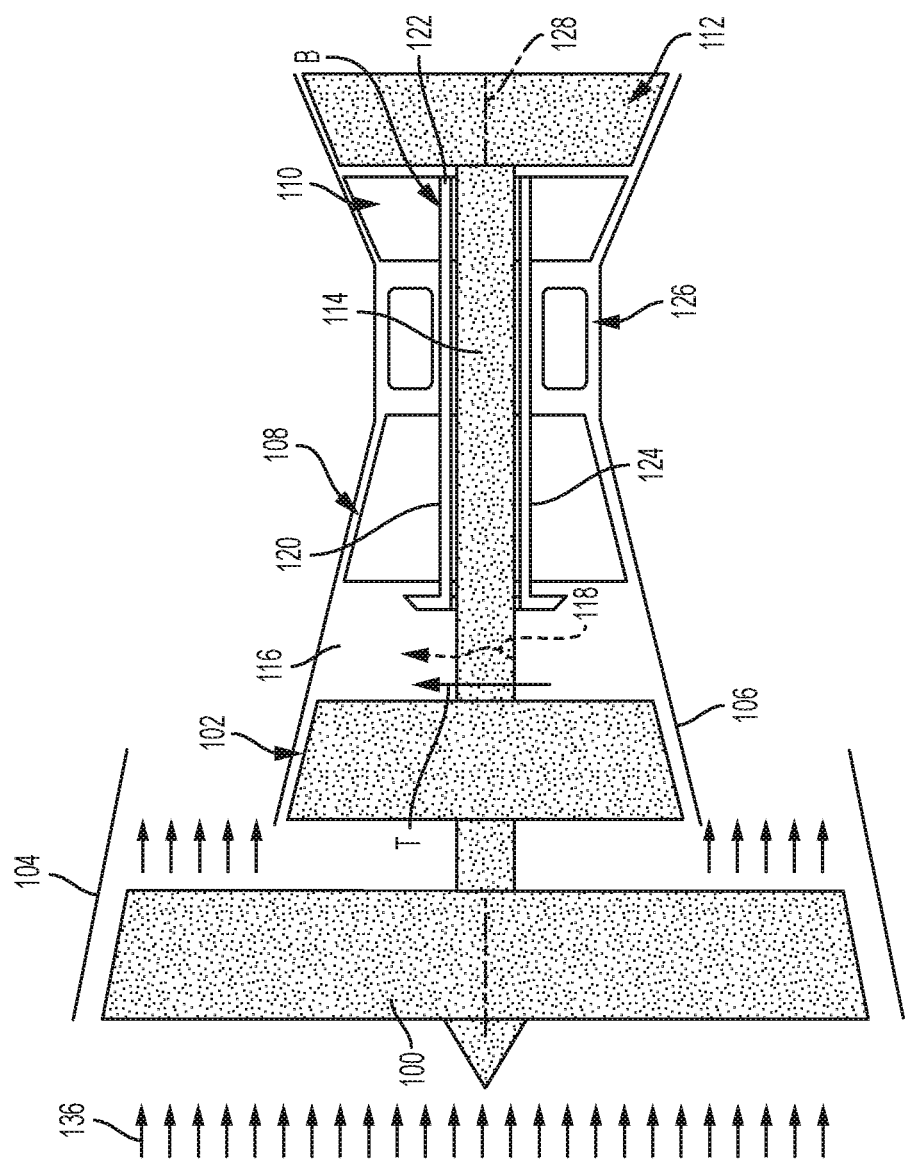
FIG. 1A is a schematic illustration of a gas turbine engine.
Figure 1B:
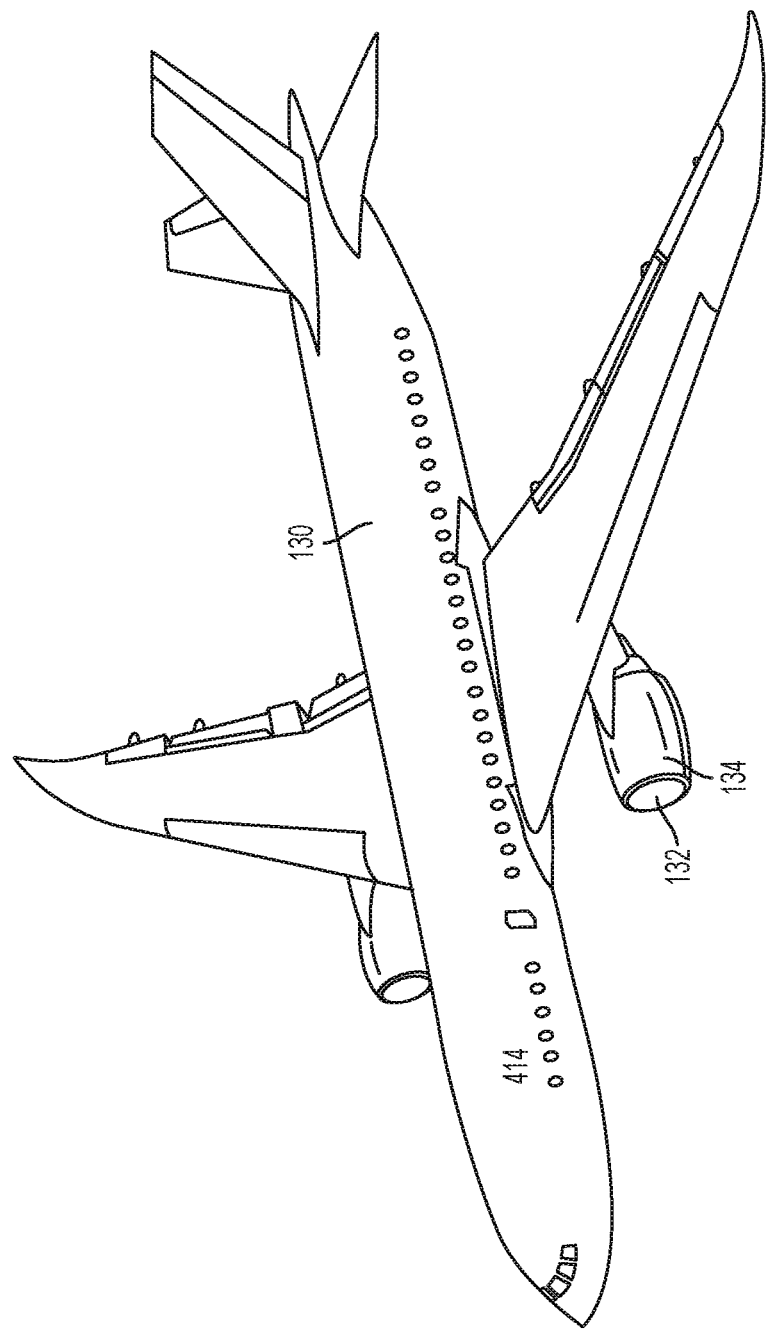
FIG. 1B illustrates the gas turbine engine mounted in a nacelle on an aircraft.

In the following description, reference is made to the accompanying drawings which form a part hereof, and which is shown, by way of illustration, several embodiments. It is understood that other embodiments may be utilized and structural changes may be made without departing from the scope of the present disclosure.

The present disclosure describes an aircraft engine assembly comprising a gas turbine engine including a rotor 108 having a rotor shaft 122, wherein the rotor shaft has a longitudinal axis 128, AA'; a casing 106 and/or nacelle 134 comprising trapped air 116 creating a temperature gradient increasing along vector T perpendicular to the longitudinal axis 128, AA when the gas turbine engine is cooling down in the temperature gradient; and means for rotating the rotor using pressurized fluid. The rotor 108 comprising a rotor shaft 122 is housed in the casing 106 and nacelle 134 and the rotating reduces or prevents thermal bowing of the rotor shaft 122 in the temperature gradient T.

Several examples of the means for rotating the rotor are further described below.

First Example

Figure 2A:
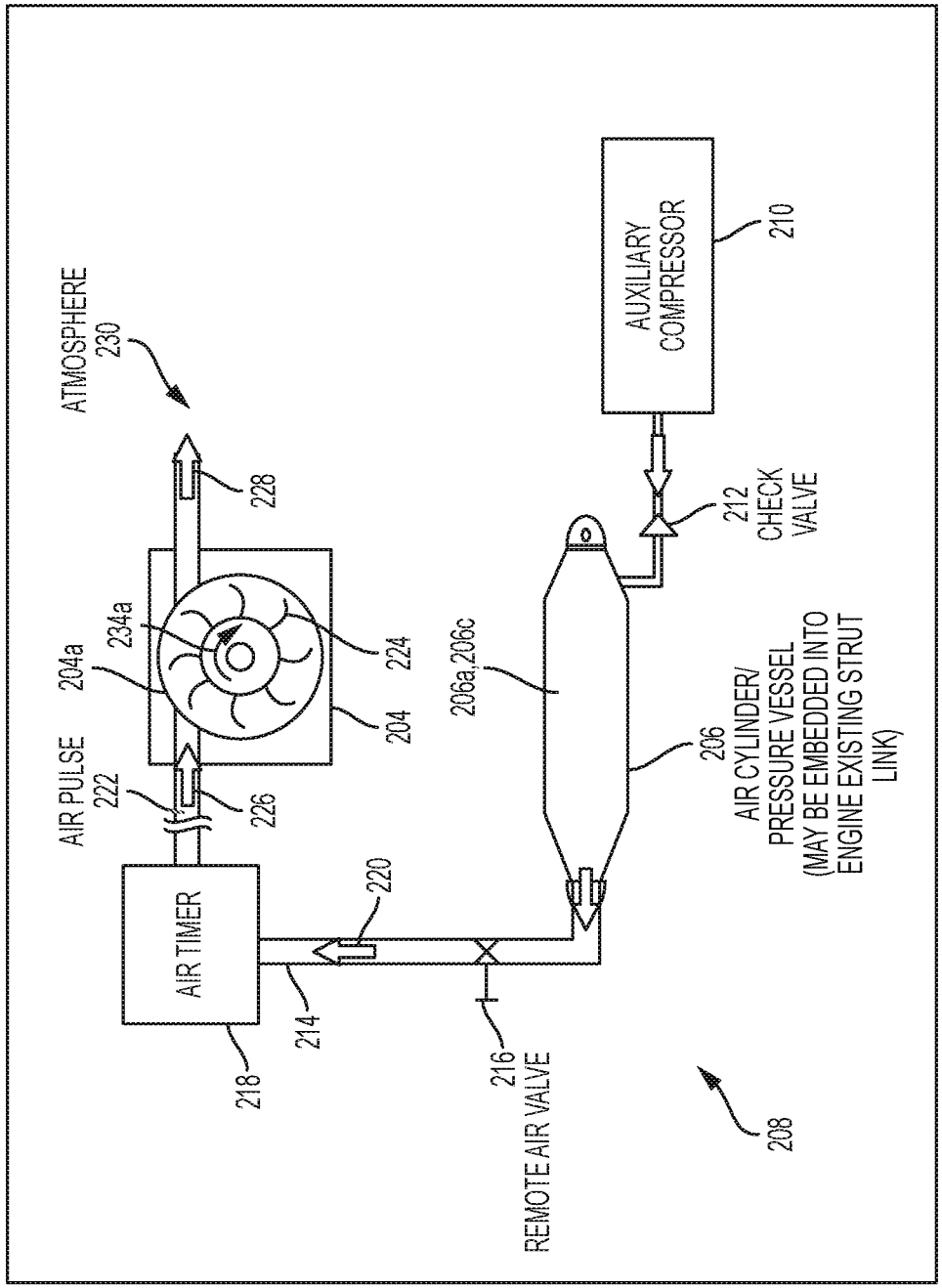
FIG. 2A is a cross sectional schematic of a system providing pressurized gas to an accessory turbine mounted on a rotor shaft, according to one or more embodiments.
Figures 2B, 2C:
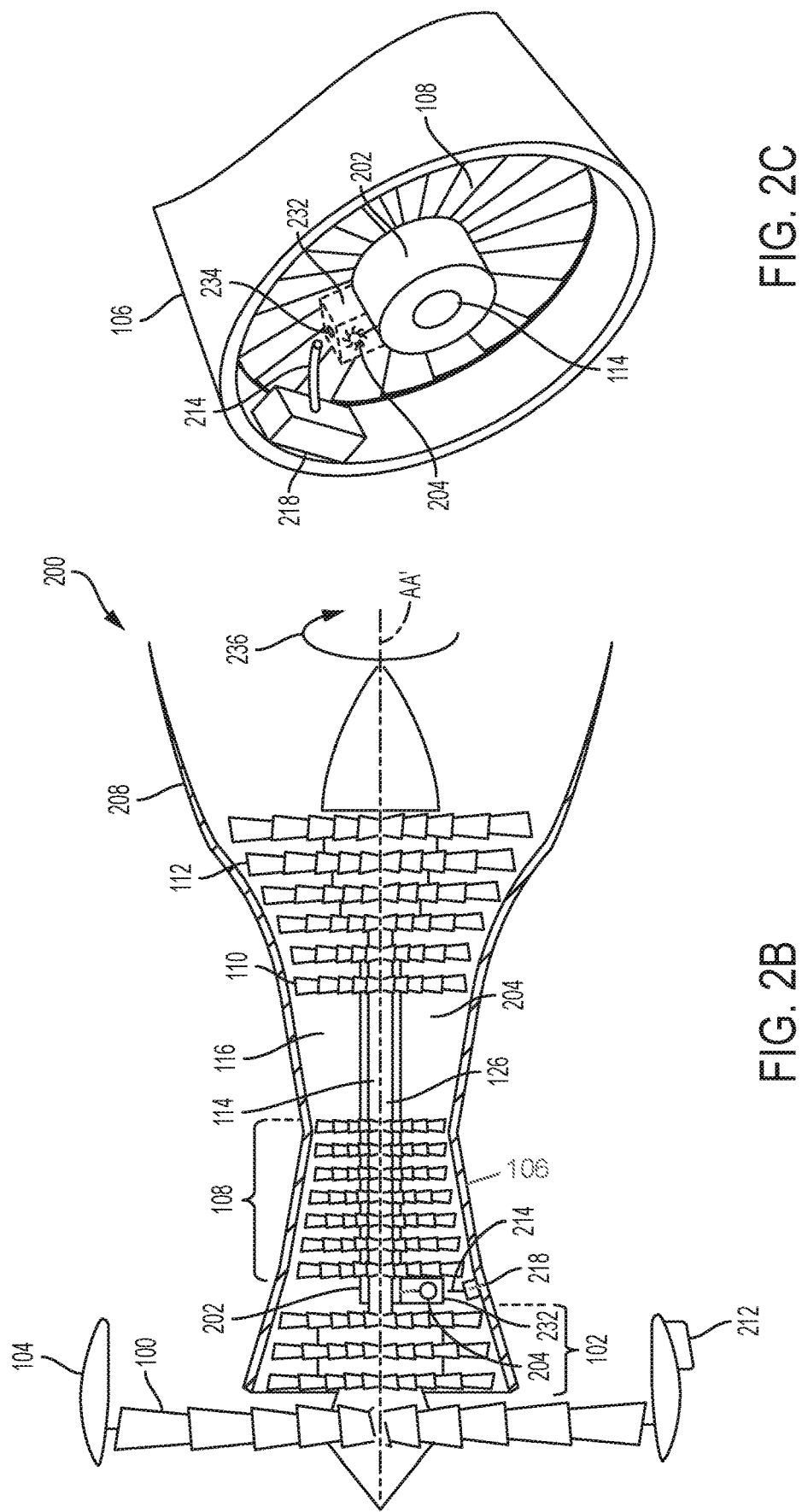
FIG. 2B illustrates an engine rotor mounted air paddle-turbine, according to one or more embodiments.
FIG. 2C is a close up view of the engine rotor mounted air paddle turbine in FIG. 2B.

FIGS. 2A, 2B, and 2C illustrate a gas turbine engine 200 including a rotor shaft 202 having a longitudinal axis AA'; a pneumatic motor 204 mounted on the rotor shaft 202; and a pressure vessel (air cylinder 206) connected 208 to the pneumatic motor 204. An auxiliary compressor 210 pressurizes the pressure vessel 206 with air through a check valve 212.

One or more ducts 214, an air supply valve/remote air valve 216, and a pneumatic timer 218 connect the pressure vessel 206 (containing compressed air 206a) to the motor 204. The remote air valve 216 connected to the ducting 214 regulates flow 220 of the compressed air 206a from the pressure vessel 206 to the pneumatic timer 218. The pneumatic timer 218 connected to the ducting 214 portions the flow of compressed air 206a into air pulses 222.

The pneumatic motor 204 comprises an accessory turbine 204a comprising paddles 224, an input 226 connected to the ducting 214 receiving the air pulses 222, and an output 228 to atmosphere 230. The air pulses 222 delivered onto the paddles 224 drive the accessory turbine 204a housed in turbine housing 232.

The accessory turbine 204a is mounted on the rotor shaft 202 such that the accessory turbine 204a converts pressure exerted by the air pulses 222 into torque 234a that drives the rotor shaft 202 so as to rotate 236 the rotor shaft 122 about axis AA'. The pneumatic timer 218 is mounted on the turbine housing. In another embodiment, the pneumatic timer 218 is mounted on the engine casing 106 or 104 or other engine housing.

This first example does not require a dedicated pad on an accessory gearbox and thus provides enhanced spatial integration and technology packaging.

Second Example

Figure 3A:
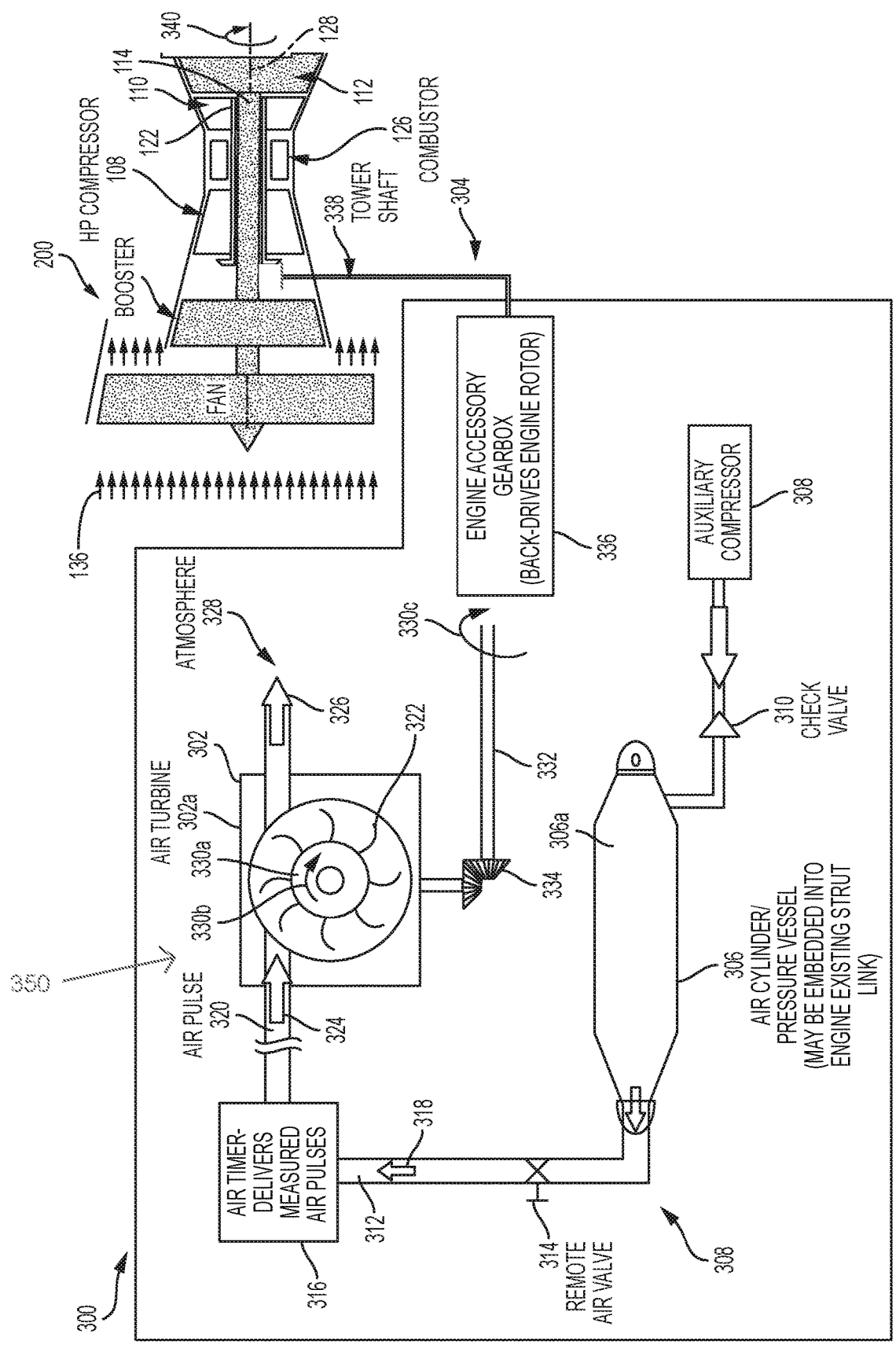
FIG. 3A illustrates an accessory gearbox mounted air turbine, according to one or more embodiments.

FIG. 3A illustrates another system 300 or apparatus for rotating a rotor shaft 122. The system comprises a pneumatic motor 302, a transmission 304 connecting the pneumatic motor 302 to the rotor shaft 122, and a pressure vessel 306 connected to the pneumatic motor 302. An auxiliary compressor 308 pressurizes the pressure vessel 306 with air 306a through a check valve 310.

A duct 312 or system of ducts 312, an air supply valve or remote air valve 314, and a pneumatic timer 316 connect the pressure vessel 306 (containing compressed air 306a) to the motor 302. The remote air valve 314 connected to the duct 312 regulates flow 318 of the compressed air 306a from the pressure vessel 306 to the pneumatic timer 316. The pneumatic timer 316 connected to the duct 312 portions the flow 318 of compressed air 306a into air pulses 320.

The pneumatic motor 302 comprises an accessory or air turbine 302a comprising paddles 322, an input 324 connected to the duct 312 and receiving the air pulses, and an output 326 to atmosphere 328. The air pulses 320 delivered onto the paddles 322 drive the accessory turbine 302a. Thus, the accessory turbine 302a converts pressure exerted by the air pulses 320 into torque 330a or rotation 330b, 330c used to drive rotation 340 of the rotor shaft 122 about axis AA', 128 when the air pulses 320 are supplied to the accessory turbine 302a through the ducts or conduit 312. In one embodiment, the paddles 322 are intermittently driven by the air pulses. In another embodiment, the paddles 332 are driven by measured timed air pulses from the pneumatic timer 316.

The transmission 304 (comprising drive shafts 332, gearing (beveled gears 334), an accessory gearbox 336; and a tower shaft 338) applies the torque 330a to the rotor shaft 122 so as to rotate 340 the rotor shaft 122. Specifically, when the pneumatic motor 302 is activated and operatively coupled to the rotor shaft 122 via the transmission 304, the pneumatic motor 302 drives the engine accessory gearbox 336 via the drive shafts 332 and the engine accessory gearbox 336 back-drives the rotor shaft 122 by driving the tower shaft 338.

While the second example illustrates the pneumatic motor 302 driving the accessory gearbox 336, in another embodiment, the pneumatic motor drives the compressor rotor shaft 122 directly via the tower shaft 338 and drive shaft 332 without connecting to the gearbox 336.

Figure 3B:
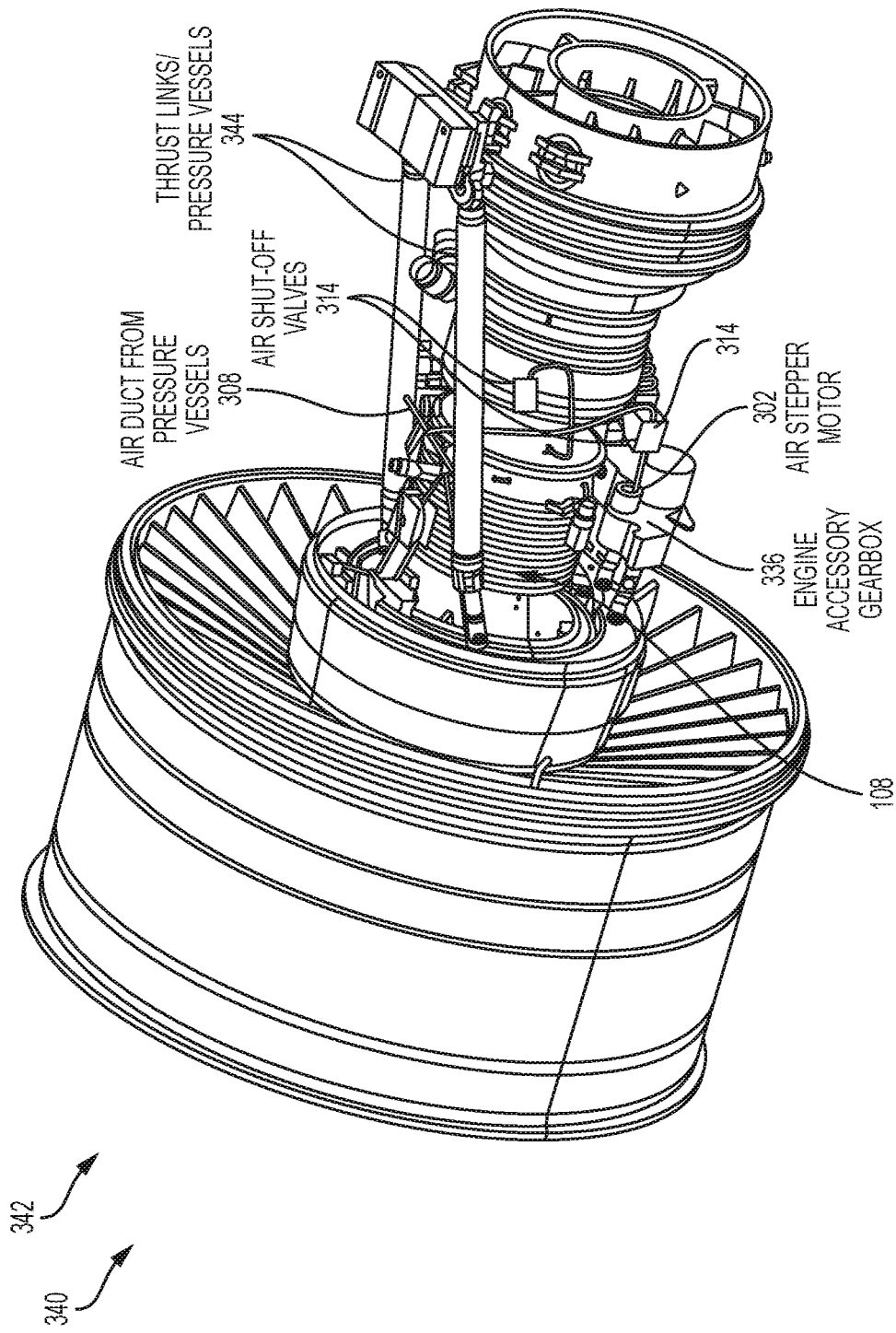
FIG. 3B illustrates an engine connected to a thrust link comprising the pressure vessel, according to one or more embodiments.

FIG. 3B illustrates an aircraft engine assembly 340 comprising a gas turbine engine 342 comprising the rotor 108, wherein the gas turbine engine 342 is connected to a thrust link 344, and the thrust link 344 comprises or embeds the pressure vessel 306. Thus, the aircraft engine assembly 340 comprises the pneumatic motor 302 connected to a transmission (including gearbox 336) connected to the rotor 108 comprising rotor shaft 122; the pressure vessel 306; a valve 314; and ducting 312 connected to the valve 314, the pressure vessel 306, and the motor 302.

In another variation, a fluid other than air is used, such as, but not limited to, nitrogen.

Third Example

Figure 4A:
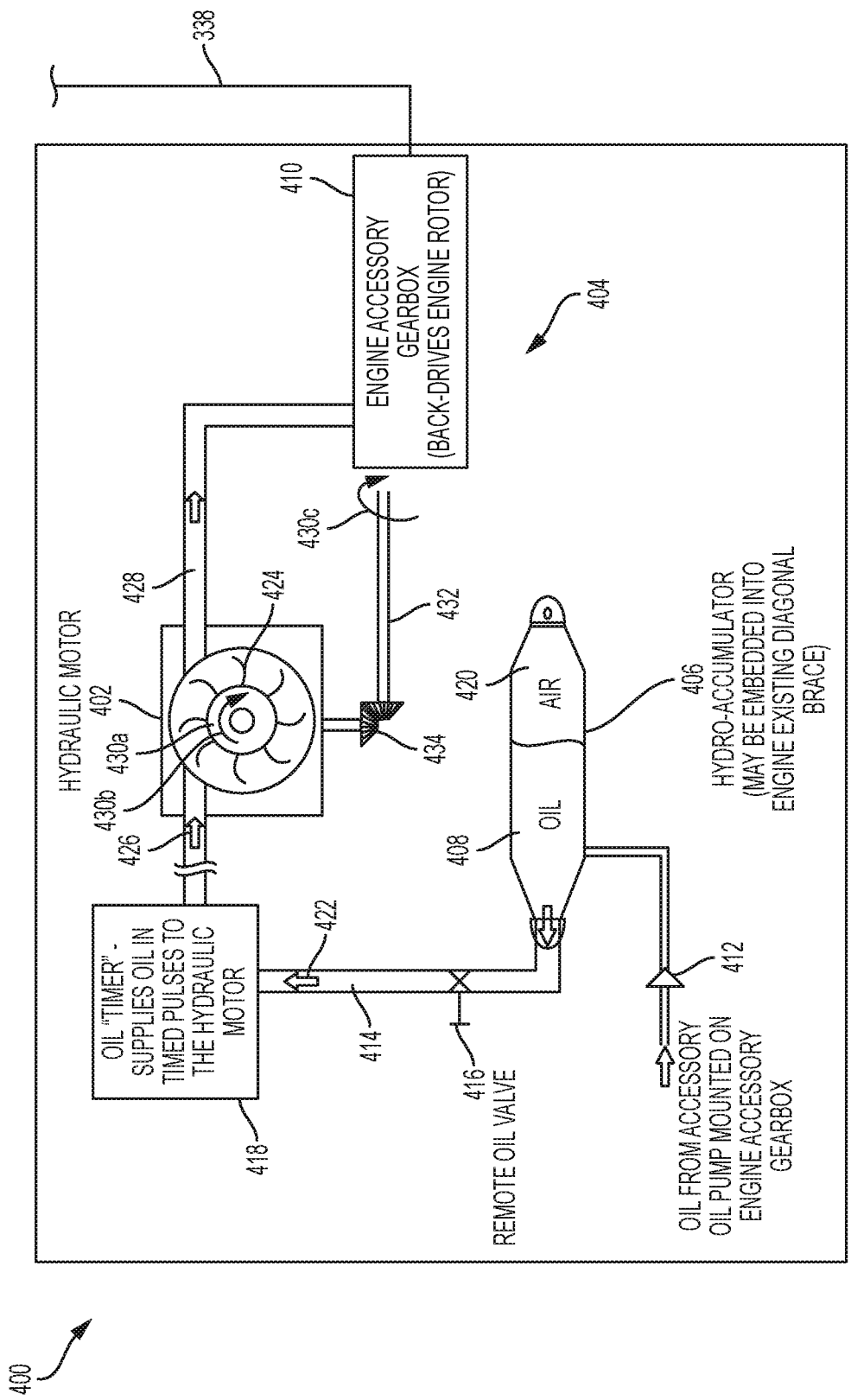
FIG. 4A illustrates an accessory gearbox mounted hydraulic motor, according to one or more embodiments.

FIG. 4A illustrates yet another system 400 or apparatus for rotating a rotor shaft 122. The system comprises a hydraulic motor 402, a transmission 404 connecting the hydraulic motor 402 to the rotor shaft 122, and a pressure vessel comprising a hydro-accumulator 406 connected to the hydraulic motor 402. Oil 408 from an accessory oil pump mounted on the engine accessory gearbox 410 supplies oil to the hydro-accumulator via check valve 412.

A duct or conduit 414 or system of ducts or conduits 414, a remote oil valve 416, and an oil timer 418 connect the hydro-accumulator 406 (containing pressurized oil 408 and air 420) to the motor 402. The remote oil valve 416 connected to the duct 414 regulates flow 422 of the oil from the hydro-accumulator to the oil timer 418. The oil timer 418 connected to the duct 414 portions the flow 422 of compressed oil into oil pulses.

The hydraulic motor 402 comprises paddles 424, an input 426 connected to the duct 414 and receiving the oil pulses, and an output to the engine accessory gearbox 410 via duct 428. The oil pulses delivered onto the paddles 424 drive the motor 402. Thus, the motor 402 converts pressure exerted by the oil pulses into torque 430a or rotation 430b, 430c used to drive the rotor shaft 122, when the oil pulses are supplied to the motor 402 through the ducts or conduit 414. In one embodiment, the paddles 422 are intermittently driven by the oil pulses. In another embodiment, the paddles 422 are driven by measured, timed oil pulses from the oil timer 418.

The transmission 404 (comprising drive shafts 432, gearing (beveled gears 434), an accessory gearbox 410; and a tower shaft 338) applies the torque 430a to the rotor shaft 122 so as to rotate 340 the rotor shaft 122 about axis 122. Specifically, when the hydraulic motor 402 is activated and operatively coupled to the rotor shaft 122 via the transmission 404, the hydraulic motor 402 drives the engine accessory gearbox 410 via the drive shafts 432 and the engine accessory gearbox 410 back-drives the rotor shaft 122 by driving the tower shaft 338.

While the second example illustrates the hydraulic motor 402 driving the accessory gearbox 410, in another embodiment, the pneumatic motor drives the rotor shaft 122 directly via the tower shaft 338 and drive shaft 432 without connecting to the gearbox 410.

Figure 4B:
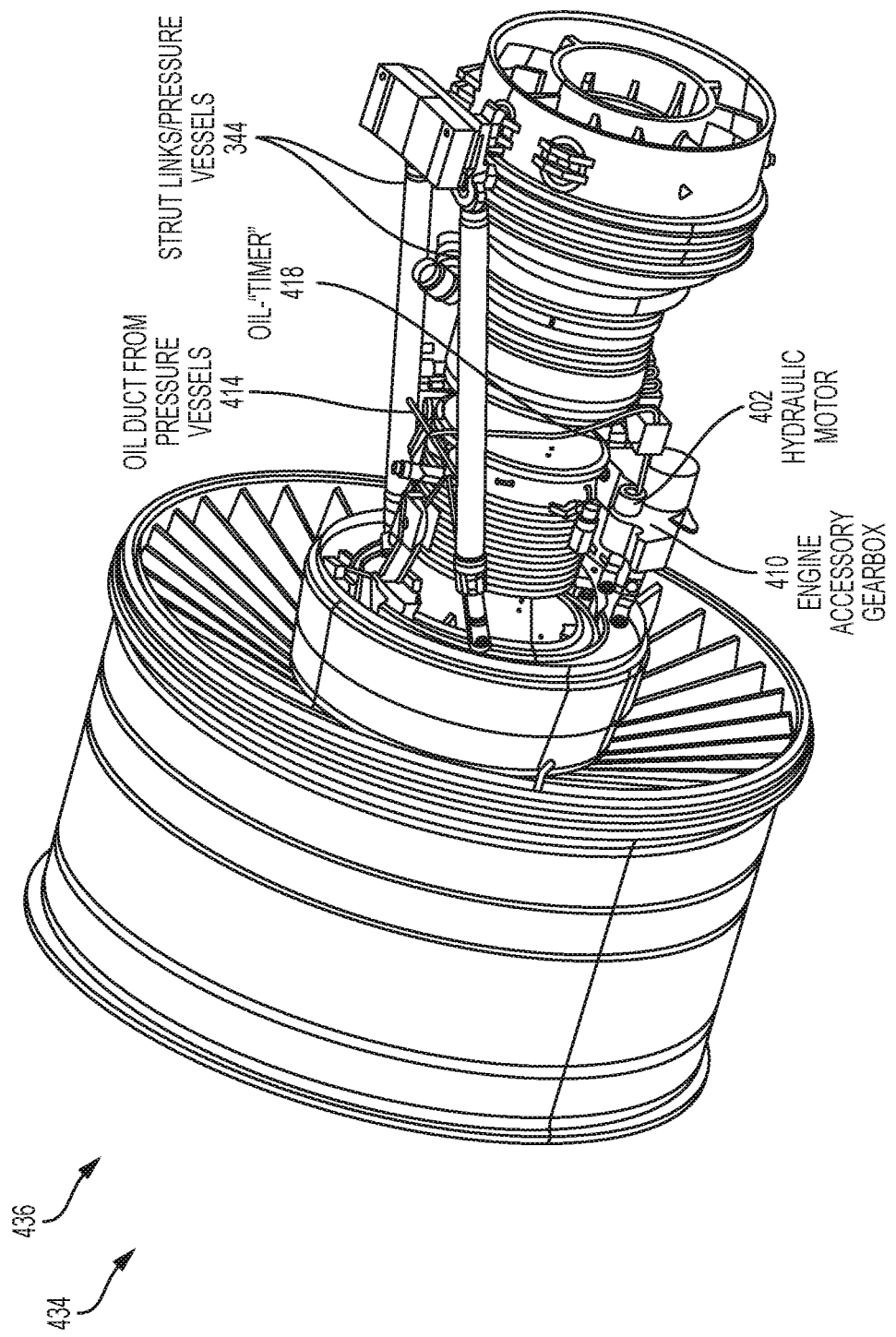
FIG. 4B illustrates an engine comprising thrust link comprising a hydro-accumulator, according to one or more embodiments.

FIG. 4B illustrate an aircraft engine assembly 434 comprises engine 436 comprising rotor 108, wherein the aircraft engine assembly 434 comprises the hydraulic motor 402 connected to a transmission (including gearbox 410) connected to the rotor shaft 122; strut links 344 comprising or embedding the pressure vessel 406; a valve 416; and ducting 414 connected to the valve 416, the pressure vessel 406, and the motor 402.

In another variation, a fluid other than oil 408 is used.

Process Steps

Fabrication

Figure 5:
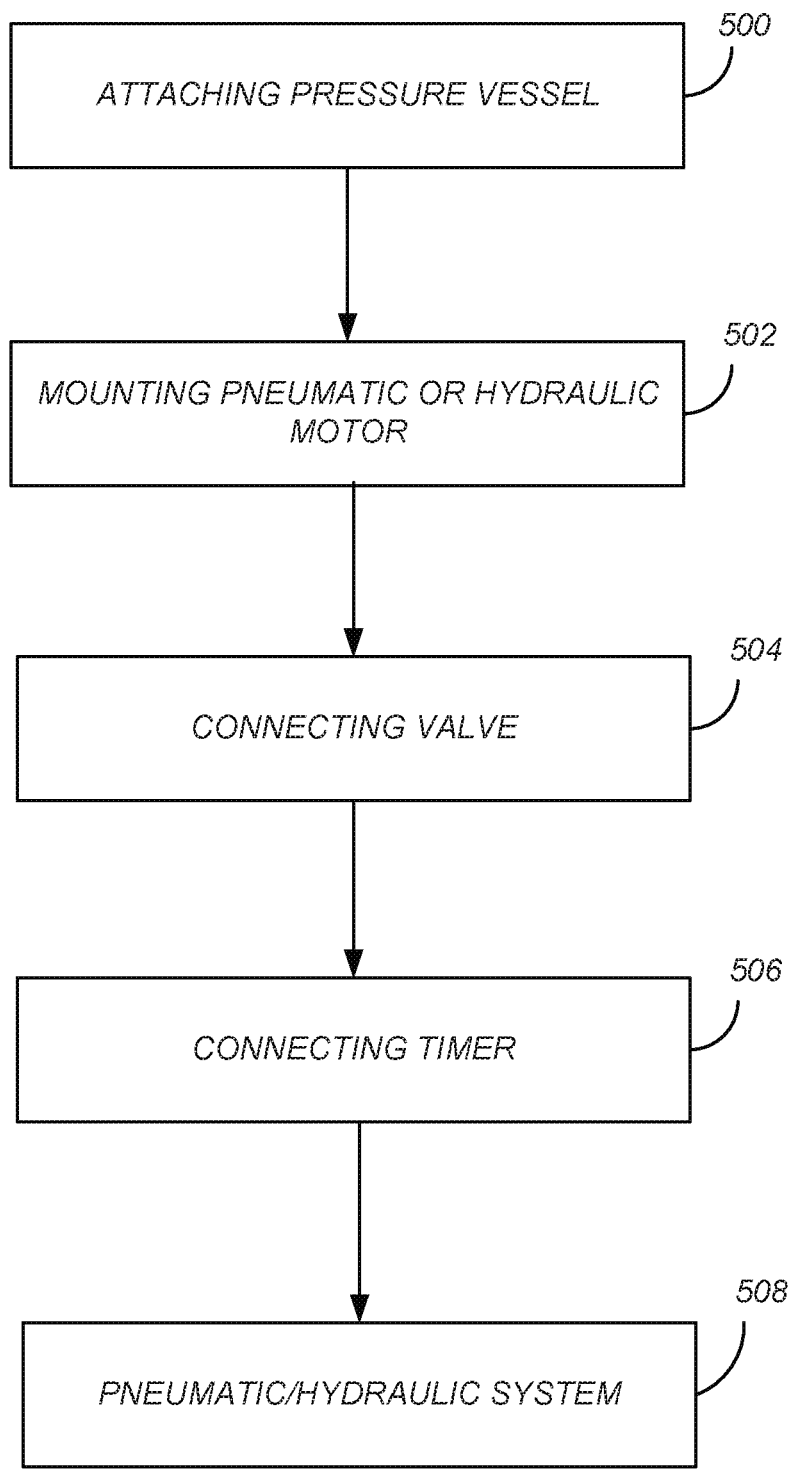
FIG. 5 is a flowchart illustrating a method of fabricating a system for rotating a rotor shaft, according to various embodiments.

FIG. 5 is a flowchart illustrating a method of fabricating means for rotating a rotor shaft using pressurized fluid. Examples of the rotor shaft 202, 122 include a low-pressure or a high-pressure shaft 122 in a $_2$-spool engine 200, 346, or a low-pressure or intermediate-pressure shaft in a 3 spool engine.

Block 500 represents attaching a pressure vessel 306, 408 to an aircraft, e.g. to a thrust link 346, brace, strut link, engine strut 344 attached to the gas turbine engine 342. In one embodiment the thrust link 346, brace, strut link, or engine strut 344 comprises or doubles as the pressure vessel 306, 406.

Block 502 represents mounting a pneumatic motor 204, 302, or hydraulic motor 402.

Block 504 represents connecting a valve 216, 314, 416 to the pressure vessel 306, 406 using a duct 214, 312, 414.

Block 506 represents connecting a timer 418, 316, 218 to the valve 216, 314, 416 using a duct 214, 312, 414.

Block 506 further represents connecting the timer 418, 316, 218 to the pneumatic motor 204, 302 or hydraulic motor 402 using a duct 214, 312, 414.

Block 508 represents the end result, a pneumatic or hydraulic system or means for rotating 236, 340 the shaft 122, 202 using pressurized fluid 408, 320.

In one embodiment, the means comprises a pressure vessel 406 for containing oil 408; the valve 416 connected to the pressure vessel 406; the oil timer 418 comprising oil 408 connected to the valve 416; and a hydraulic motor 402 rotating 340 the rotor shaft 122 about axis 128 when the oil 408 is supplied to the hydraulic motor 402 from the oil timer 418 and the hydraulic motor 402 is coupled to the rotor shaft 122, as illustrated in FIG. 4A.

In another embodiment, means for rotating the rotor shaft 122 comprises the pressure vessel 306, 206 for containing the pressurized fluid 206c (e.g., compressed air 306a or oil 408); a valve 216, 314, 416 connected to the pressure vessel 306, 408, 206; and a stepper motor 350 connected or coupled to the rotor shaft 122. In one embodiment, the stepper motor 350 comprises a combination of the timer 218 and motor 204, 302, 402 as illustrated in FIGS. 2A, 3A, 4A.

In yet another embodiment, the means for rotating the rotor comprises an accessory turbine 204a directly mounted on the rotor shaft 202, as illustrated in FIG. 2A. The pneumatic timer 218 applies/delivers/supplies the compressed air 222 that enters the accessory turbine 204a. The compressed air 222 rotates 234a the accessory turbine 204a and the gas turbine rotor shaft 202 connected to the accessory turbine 204a. FIG. 2A illustrates a casing 106 housing the gas turbine engine 200; and a pneumatic timer 218 connected to the ducting 214 and mounted on the casing 106, wherein the fluid comprises compressed air 206a; the pneumatic timer 218 pulses the compressed air 206a delivered from the pressure vessel 206 so as to deliver pulses 222 of the compressed air 206a to the motor 204; the pneumatic motor 204, comprising an accessory turbine 204a mounted on the rotor shaft 202, applies torque 234a that rotates 236 the rotor shaft 202 when the pulses 222 drive 234a the accessory turbine 204a.

Operation

Figure 6:
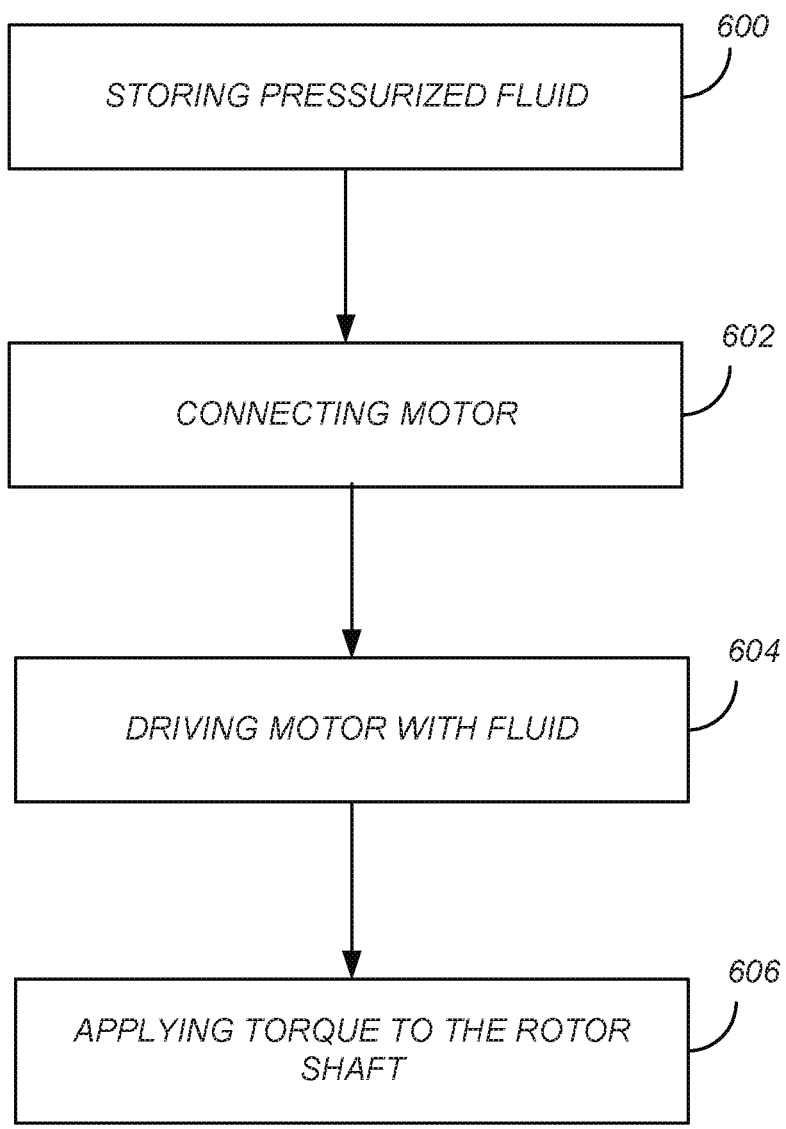
FIG. 6 is a flowchart illustrating a method of mitigating rotor shaft bow, according to various embodiments.

FIG. 6 is a flowchart illustrating a method for rotating a rotor shaft 122, 202 in a gas turbine engine 342. The gas turbine engine 200, 342 is typically housed in a nacelle 134 attached to the aircraft.

Block 600 represents storing pressurized fluid 206a, 408 on the aircraft. In one embodiment, pneumatic energy is stored by compressing the fluid (e.g., air 206a or oil 408) into a pressure vessel 306, 206, 406 using power generated while the engine 200, 342 is running in combustion mode with intake of air 136.

Blocks 602-606 represent driving 236 the rotor shaft 122 using the pressurized fluid 222, 408, when the rotor shaft is cooling down in a temperature gradient T perpendicular to the longitudinal axis AA', 128 of the rotor shaft 122, 202, thereby reducing or preventing any thermal bowing of the rotor shaft 122, 202 in the temperature differential/gradient T.

The driving comprises connecting the pneumatic motor 204, 302, hydraulic motor 402, or stepper motor 350 to the rotor shaft (Block 602); driving 234a, 330a, 430a the pneumatic motor 204, 304 or hydraulic motor 402 with the pressurized fluid 408, 222, 320 (Block 604) so that the pneumatic motor 204, 302 or hydraulic motor 402 converts pressure exerted by the pressurized fluid 222, 320, into torque 234a, 330a, 430a; and applying the torque 234a, 330a, 430a to the rotor shaft 122 so that the torque 234a, 330a, 430a rotates 340, 236 the rotor shaft 122 (Block 606). In one embodiment, the driving 234a, 330a, 430a comprises inputting fluid 220, 318, 422 from the pressure vessel 206 into a timer 218, 316, 418 wherein the timer 218, 316, 418 outputs pulses of the fluid 222, 320; applying the pulses of fluid 222, 320 onto paddles 322, 424, 224 of the accessory turbine 302a, 204a, 402, wherein the pulses of fluid drive the paddle turbine 204a, 302a so that the paddle turbine 302a, 204a, 402 outputs torque 330a, 430a; and connecting the accessory/paddle turbine 302, 204, 402 to the rotor shaft 122 so that the torque 330a, 330b is used to rotate 236, 340 the rotor shaft 122, 202.

In one embodiment, the accessory turbine 204a mounted on the rotor shaft 202 and the accessory turbine 204a rotates 236 the rotor shaft 202 when the pneumatic timer 218 applies the compressed air 222 onto the accessory turbine 204a.

The stepper motor embodiment rotates 340 the rotor 108 and shaft 122 when the pressurized fluid (e.g., air 206a, 306a) is supplied to the stepper motor from the pressure vessel, releasing the stored pneumatic/hydraulic energy in a series of bursts. The stepper motor operates similar to a winding clock, i.e., the stepper motor delivers intermittent or timed rotational motion using air or hydraulics instead of a spring. In one embodiment, the fluid supply lasts a sufficient time to enable slow rotation of the rotor 108 and subsequently gradual cooling of the rotor that prevents rotor bowing (while using the relatively low power provided by the clock-like pneumatic motor).

In one embodiment, the pneumatic motor 204, 302 or hydraulic motor 402 is used to rotate 236, 340 the rotor shaft 122, 202 soon/immediately after engine 200, 342 shut down so as to minimize departure delays. In another embodiment, the motor 204, 304, 402 is activated to rotate 236, 340 the rotor shaft 122 prior to engine start (i.e., prior to motoring the engine 200, 342, and wherein motoring refers to rotating the shaft after engine start but prior to fuel on).

Rotation Speed and Duration

The pneumatic/hydraulic motor 204, 302, 402 rotates 340, 236 the rotor shaft 122, 202 at one or more speeds, using one or more torques, and/or for one or more durations, so as to reduce or prevent the thermal bowing of the rotor shaft in the temperature differential. Examples of rotation speeds include, but are not limited to, low speeds such as between 0.5-2.0 rpm.

Rotation of the rotor includes, but is not limited to, pulsed rotation, continuous rotation, a combination of both pulsed rotation and continuous rotation, clocked rotation, and/or sporadic rotation.

In one periodic pulsing scheme, torque is applied after a plurality of minutes (e.g. every 5-15 minutes) so that the rotor rotates a partial turn or in increments. In one embodiment, partial turns are 'clocked,' e.g., for a one-half turn. In another example, the pulse provides random rotor movement. In one embodiment, pulse modulation is achieved by programming the pneumatic or hydraulic timer to emit carefully timed pulses. In one embodiment, the piezoelectric motor rotates the shaft by turning the shaft in one or more increments comprising a partial revolution of the shaft.

In one example, the rotation speed and duration are such that the probability of a compressor rub is less than e-8 per flight-hour.

System Dimensions

In one or more embodiments, the pneumatic/hydraulic motor system described herein has weight and dimensions optimized for compactness to overcome weight and space constraints, e.g., so that the hydraulic/pneumatic motor system can be integrated into the engines of smaller aircraft such as a Boeing 737 Max. In one example, the pneumatic or hydraulic motor has a diameter of at most 6", is at most 12" long, and has a weight of at most 25 pounds. However, the hydraulic/pneumatic motor can be implemented in all aircraft, including, but not limited to, Boeing 787, 777, and 747 aircraft.

Example System Features

One or more embodiments of the ETM system comprise a pneumatic or hydraulic motor system installed in an aircraft using components such that:

the aircraft is capable of being dispatched for at least 10 days after a failure of the ETM;

failure of the ETM system does not require line maintenance to dispatch the aircraft;

failure of the ETM does not interfere with engine operation, and in particular, does not interfere with engine start;

failure rate of the ETM is e-5 per flight hour or better;

the ETM is sufficiently reliable that a backup scheme is not required (e.g., the ETM has a reliability of at least e-6 per flight hour or at least e-7 per flight hour);

the ETM has a lock out feature, in case unforeseen issues arise and the system must be easily disabled;

energy demands for rotating the rotor and reducing the thermal bowing are reduced as compared to systems using an electric motor to rotate the rotor; and/or the installation and certification is easier as compared to systems using an electric motor to rotate the rotor (e.g., the ETM system does not include a new ignition source or fuel source adding to engine fire protection designs).

Processing Environment

Figure 7:
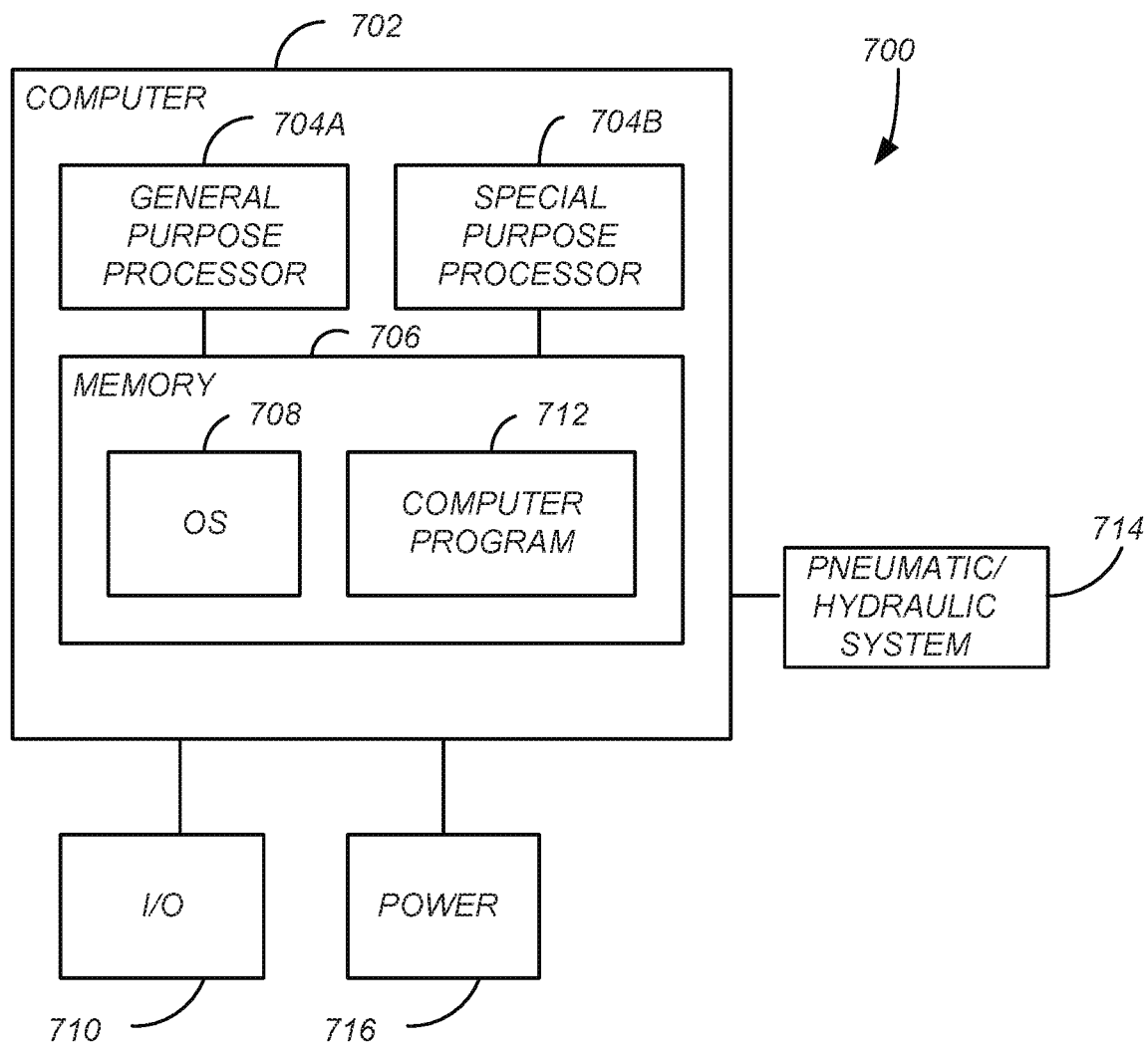
FIG. 7 illustrates a hardware environment for operating the pneumatic or hydraulic motor, according to one or more embodiments.

FIG. 7 illustrates an exemplary computer or system 700 that could be used to implement processing elements needed to control rotation of the hydraulic or pneumatic motor systems 714, 300, 400 described herein. The computer system is typically located on the aircraft e.g., but not limited to, in a box mounted on the engine fan case 104, casing 106, or inside the aircraft.

The computer 702 comprises a processor 704 (general purpose processor 704A and special purpose processor 704B) and a memory, such as random access memory (RAM) 706. Generally, the computer 702 operates under control of an operating system 708 stored in the memory 706, and interfaces with the user/other computers to accept inputs and commands (e.g., analog or digital signals) and to present results through an input/output (I/O) module 710. The computer program application 712 accesses and manipulates data stored in the memory 706 of the computer 702. The operating system 708 and the computer program 712 are comprised of instructions which, when read and executed by the computer 702, cause the computer 702 to perform the operations herein described. In one embodiment, instructions implementing the operating system 708 and the computer program 710 are tangibly embodied in the memory 706, thereby making a computer program product or article of manufacture. As such, the terms "article of manufacture," "program storage device" and "computer program product" as used herein are intended to encompass a computer program accessible from any computer readable device or media.

In one embodiment, computer 702 comprises one or more field programmable gate arrays (FPGAs).

In one embodiment, the computer 700 comprises a controller activating the pneumatic/hydraulic motor by regulating/activating the valve and/or the timer. In one embodiment, an Electronic Engine Control (EEC) unit sends a digital request to the controller, via I/O 710, to reduce/increase the pneumatic/hydraulic pressure via the timer or air supply valve, thus controlling compressor rotor speeds. In yet another embodiment, the computer provides status to the EEC via I/O 710 so that the controller and/or the EEC monitor system monitor performance and/or control the rotation of the rotor.

In another embodiment, the computer activates the pneumatic/hydraulic motor 204, 302, 404 after receiving a signal from an engine shut off switch indicating the engine 200, 342 has been shut off, thereby activating the pneumatic or hydraulic motor. In one example, the pneumatic or hydraulic motor rotates the rotor soon/immediately after engine shut down so as to minimize aircraft departure delays caused by mitigating rotor shaft bow. In another embodiment, the computer 702 activates the pneumatic or hydraulic motor prior to engine start (i.e., prior to motoring the engine).

In another embodiment, the duration of rotation is optimized by having the computer estimate the amount of bow (based on time since last engine shutdown) and calculate the required rotation duration to be implemented. Various instrumentation to monitor the bowing can include accelerometers already used for vibration monitoring or microwave-based gap measuring sensors.

FIG. 7 further illustrates a power source 716 for providing power to the system 700.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An aircraft engine assembly, comprising:
   a gas turbine engine including a rotor having a rotor shaft, wherein the rotor shaft has a longitudinal axis;
   a nacelle housing the rotor and comprising trapped air creating a temperature gradient perpendicular to the longitudinal axis when the gas turbine engine is cooling down; and
   means for rotating the rotor shaft using intermittent rotational motion driven by a pressurized fluid outputted by at least one of a timer or a stepper motor, the rotating reducing or
   preventing thermal bowing of the rotor shaft in the temperature gradient.

2. The aircraft engine assembly of claim 1, wherein the means for rotating comprises:
   a pressure vessel for containing the pressurized fluid;
   a valve connected to the pressure vessel; and
   the stepper motor rotating the rotor shaft when the pressurized fluid is supplied to the stepper motor from the pressure vessel and the stepper motor is coupled to the rotor shaft.

3. The aircraft engine assembly of claim 2, further comprising a thrust link attached to the gas turbine engine and doubling as the pressure vessel.

4. The aircraft engine assembly of claim 1, wherein the means for rotating comprises:
   a pressure vessel for containing the pressurized fluid comprising compressed air;
   a valve connected to the pressure vessel;
   the timer comprising a pneumatic timer connected to the valve; and
   an accessory turbine mounted on the rotor shaft, the accessory turbine rotating the rotor shaft when the pneumatic timer applies the compressed air onto the accessory turbine.

5. The aircraft engine assembly of claim 4, wherein the pneumatic timer is mounted on the nacelle.

6. The aircraft engine assembly of claim 4, further comprising a thrust link attached to the gas turbine engine and comprising the pressure vessel.

7. The aircraft engine assembly of claim 1, wherein the means for rotating further comprises:
   a pressure vessel for containing the pressurized fluid comprising oil;

a valve connected to the pressure vessel;
the timer comprising an oil timer connected to the pressure vessel; and
a hydraulic motor rotating the rotor when the oil is supplied to the hydraulic motor from the oil timer and the hydraulic motor is coupled to the rotor shaft.

8. The aircraft engine assembly of claim 7, further comprising a brace or strut link attached to the gas turbine engine and comprising the pressure vessel.

9. An aircraft engine, comprising:
a gas turbine engine including a rotor shaft;
a motor comprising a hydraulic motor or a pneumatic motor mounted on the rotor shaft or connected to a transmission connected to the rotor shaft;
a pressure vessel storing a fluid;
a valve; and
ducting connected to the valve, the pressure vessel, and the motor, and wherein:
the motor converts pressure exerted by the fluid into torque driving the rotor shaft when the fluid is delivered to the motor through the ducting and the valve; and
the motor comprises a stepper motor or the motor comprises a turbine connected to a timer, the timer applying pulses of the fluid onto the turbine so as to drive the turbine.

10. The aircraft engine of claim 9, wherein:
the transmission applies the torque to the rotor shaft so as to rotate the rotor shaft.

11. The aircraft engine of claim 10, further comprising the timer comprising a pneumatic timer or a hydraulic timer connected to the ducting, wherein the pneumatic timer or the hydraulic timer pulses the fluid so as to deliver pulses of the fluid to the motor.

12. The aircraft engine of claim 11, wherein the timer is the hydraulic timer, the motor is the hydraulic motor, and the fluid comprises oil.

13. The aircraft engine of claim 11, wherein the timer is the pneumatic timer, the motor is the pneumatic motor, and the fluid comprises compressed air.

14. The aircraft engine of claim 9, further comprising:
a casing housing the gas turbine engine; and
the timer comprising a pneumatic timer connected to the ducting and mounted on the casing, wherein:
the fluid comprises compressed air;
the pneumatic timer pulses the compressed air delivered from the pressure vessel so as to deliver pulses of the compressed air to the motor; and
the pneumatic motor, comprising an accessory turbine mounted on the rotor shaft, applies torque to the rotor shaft when the pulses drive the accessory turbine.

15. The aircraft engine of claim 9, further comprising a thrust link, a brace, or a strut attached to the gas turbine engine and comprising the pressure vessel.

16. The aircraft engine of claim 9, wherein the gas turbine engine comprises a high pressure compressor including the rotor shaft.

17. A method of rotating a rotor shaft in an aircraft engine, comprising:
storing a pressurized fluid in a pressure vessel on an aircraft comprising a nacelle housing a gas turbine engine; and
driving the rotor shaft with intermittent rotational motion using the pressurized fluid outputted by at least one of a timer or a stepper motor, when the rotor shaft is cooling down in a temperature gradient perpendicular to a longitudinal axis of the rotor shaft, thereby reducing or preventing any thermal bowing of the rotor shaft in the temperature gradient.

18. The method of claim 17, wherein the driving comprises:
connecting a pneumatic or hydraulic motor to the rotor shaft;
driving the pneumatic or hydraulic motor with the pressurized fluid, wherein the pneumatic or hydraulic motor converts pressure exerted by the pressurized fluid into torque; and
applying the torque to the rotor shaft, wherein the torque rotates the rotor shaft.

19. The method of claim 17, further comprising storing the pressurized fluid in a thrust link comprising the pressure vessel, wherein the thrust link is attached to the gas turbine engine.

20. The method of claim 17, wherein:
the pressurized fluid is stored in the pressure vessel attached to the aircraft engine, and
the driving further comprises:
inputting the pressurized fluid into the timer, wherein the timer outputs pulses of the fluid;
connecting a paddle turbine, comprising paddles, to the rotor shaft;
applying the pulses of the pressurized fluid onto the paddles, wherein the
pulses of the pressurized fluid drive the paddle turbine and the paddle turbine outputs a torque;
connecting the paddle turbine to the rotor shaft; and
using the torque to rotate the rotor shaft.

* * * * *